No. 799,602. PATENTED SEPT. 12, 1905.
W. C. JOHNSON.
BIT.
APPLICATION FILED OCT. 4, 1904. RENEWED AUG. 22, 1905.

Witnesses
Raymond T. Barnes.
H. Lee Helms.

Inventor
William C. Johnson
By Marathas Bailey
his Attorney

# UNITED STATES PATENT OFFICE.

WILLIAM C. JOHNSON, OF OSKALOOSA, KANSAS.

BIT.

No. 799,602. Specification of Letters Patent. Patented Sept. 12, 1905.

Application filed October 4, 1904. Renewed August 22, 1905. Serial No. 275,333.

*To all whom it may concern:*

Be it known that I, WILLIAM C. JOHNSON, a citizen of the United States, and a resident of Oskaloosa, in the county of Jefferson, State of Kansas, have invented certain new and useful Improvements in Bits, of which the following is a specification.

The invention has relation to riding and driving bits; and its principal feature resides in the means for varying the working length of the mouth-bar.

This invention further consists in an improved arrangement of devices for limiting the swiveling movement of the side bars of the bit.

These improvements can best be explained and understood by reference to the accompanying drawings, in which—

Figure 1:
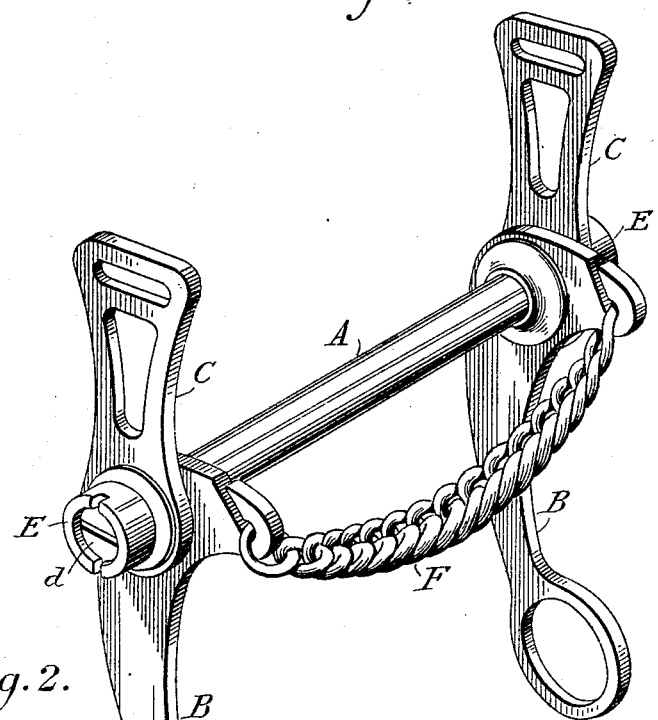
Figure 2:
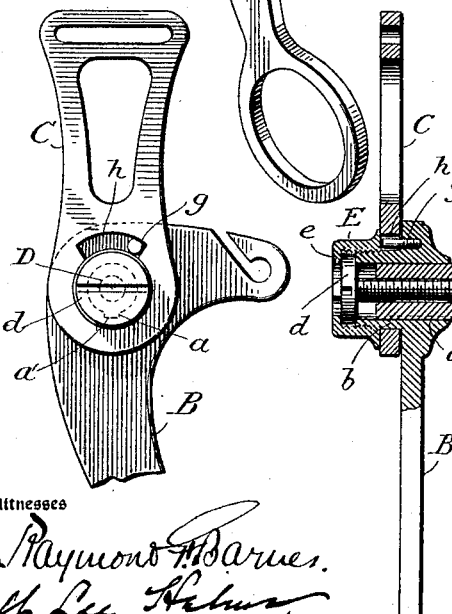
Figure 3:
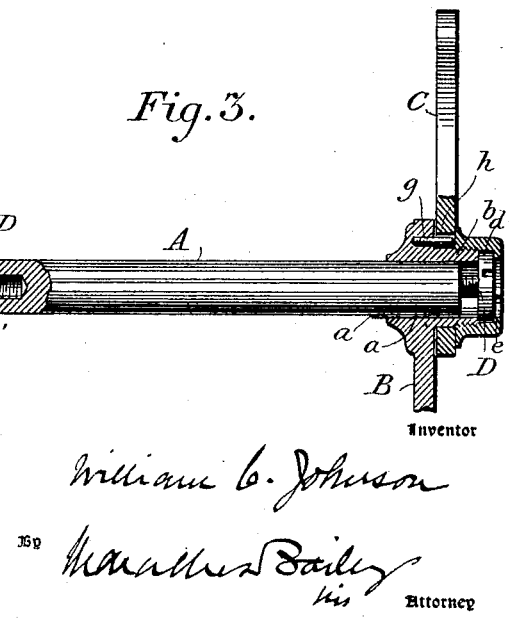

Figure 1 is a perspective view of the bit. Fig. 2 is a side elevation of the same with the lock or jam nut removed. Fig. 3 is a vertical section of the bit in the plane of the longitudinal axis of the mouth-bar.

A is the mouth-bar. B represents the side bars. C represents the cheek-pieces. F is the curb strap or chain.

The side bars B fit and can slide lengthwise of the mouth-bar A, but are prevented from rotating thereon by spline-and-groove joint $a\ a'$, as shown in Fig. 3. Upon the exterior face of each side bar is formed a hub or sleeve $b$, (in which the spline $a'$ also is formed,) encircling and fitting the end of the mouth-bar. In each end of the mouth-bar is formed an axial screw-threaded hole, which is engaged by an adjusting-screw D, the head $d$ of which abuts against the outer end of the sleeve or hub $b$ of the adjoining side bar. The outer portion of each hub is externally threaded, and upon this threaded portion screws an annular nut E, having at its outer end an annular flange $e$, which overlaps the head $d$ of the screw D. Under this arrangement it will be seen that the head of the screw D is confined between the hub $b$ of the side bar on the one hand and the flange $e$ of the nut E on the other hand, so that in whichever direction the screw D moves—out or in—the side bar must move with it. Each side bar is capable of this movement on and lengthwise of the mouth-bar, and thus by moving the side bars nearer together or farther apart the working length of the mouth-bar can be varied as desired. Each side bar can be held securely in its adjusted position by screwing down the nut E until its flange $e$ bears upon and jams on the head $d$ of the screw D, which will thus be locked in place. To permit of fresh adjustment of the side bar, all that is needed is to turn the nut far enough to loosen the hold of its flange $e$ upon the head of the screw.

The devices described admit of speedy and accurate adjustment of the side bars, and they are those which I prefer for the purpose. I do not, however, desire to be understood as restricting myself to them.

So far as I am aware I am the first to combine with the side bars and the mouth-bar of a bit an adjusting-screw for each side bar and connections between the screw and bar whereby the bar is positively moved in one direction or the other upon and lengthwise of the mouth-bar, according to the direction of movement of the adjusting-screw, as well as to combine with these devices means for severally locking the adjusting-screws in their adjusted positions.

In my Letters Patent No. 721,894, of March 3, 1903, I have described and claimed means for preventing excessive swiveling movement of the side bars, consisting of stop-pins on the cheek pieces or plates adapted to contact with the upwardly and rearwardly extension of the side bars to which the curb strap or chain is connected. For the same purpose I now make use of a stop-pin $g$ on the outer face of each side bar, which enters and engages a curved slot or recess $h$ in the adjoining cheek piece or plate C, this slot being covered and concealed by the nut E. The advantage of this arrangement over the other is that the stop devices are concealed, housed, and thoroughly protected, and there is no liability of their gathering filth or refuse.

Having described my improvements and the best way now known to me of carrying the same into practical effect, I state in conclusion that I do not restrict myself narrowly to the structural details hereinbefore described and illustrated, for manifestly the same can be varied considerably without departure from the spirit of the invention; but

What I claim herein as new, and desire to secure by Letters Patent, is—

1. In a bit, the combination with the cheek-plates, the mouth-bar and the side bars mounted on, and capable of sliding lengthwise of, the mouth-bar, but held against rotation thereon, of an adjusting-screw for each side bar carried by and engaging the mouth-bar, and connections between each adjusting-screw and its side bar whereby said bar is positively moved, in one direction or the other, upon and lengthwise of the mouth-bar, according to the direction of rotation of its adjusting-screw.

2. In a bit the combination with the cheek-plates, the mouth-bar and the side bars mounted on, and capable of sliding lengthwise of, the mouth-bar, but held against rotation thereon, of an adjusting-screw for each side bar carried by and engaging the mouth-bar, connections between each adjusting-screw and its side bar whereby said bar is positively moved, in one direction or the other, upon and lengthwise of the mouth-bar according to the direction of rotation of its adjusting-screw, and means for severally locking said screws in their adjusted positions.

3. In a bit, the combination with the mouth-bar and side bars mounted on, and capable of sliding lengthwise of, the mouth-bar, but held against rotation thereon, of annular nuts screwing upon the hubs of the side bars, and adjusting-screws entering the ends of the mouth-bar, and provided with heads confined between the hubs of the side bars and flanges or overlapping projections on the nuts, substantially as and for the purposes hereinbefore set forth.

4. In a bit, the combination of the cheek-plates, the mouth-bar swiveled in said cheek-plates, and side bars secured to the mouth-bar, there being stop-pins $g$ and slots or recesses $h$ in the meeting faces of the side bars and cheek-plates respectively, and the nuts E screwing upon the hubs of the side bars and covering the portion of the exterior faces of the cheek-plates in which said slots are formed, substantially as and for the purposes hereinbefore set forth.

In testimony whereof I affix my signature in presence of two witnesses.

WILLIAM C. JOHNSON.

Witnesses:
JAS. S. McDONOGH,
W. LEE HELMS.